March 31, 1959

J. PARNELL 2,880,394

ELECTRICAL MEASURING APPARATUS

Filed March 18, 1953

INVENTOR.
JOHN PARNELL
BY
ATTORNEY.

March 31, 1959    J. PARNELL    2,880,394
ELECTRICAL MEASURING APPARATUS
Filed March 18, 1953    2 Sheets-Sheet 1

Rectifier 3
- A: Voltage Across Conductors 1 and 2
- B: Rectified Signal Across Leads 20 and 21

Rectifier 4
- C: Current in Conductors 1 and 2
- D: Rectified Signal Across Leads 36 and 37

INVENTOR.
JOHN PARNELL
BY Arthur H. Swanson
ATTORNEY.

United States Patent Office 2,880,394
Patented Mar. 31, 1959

2,880,394

ELECTRICAL MEASURING APPARATUS

John Parnell, Philadelphia, Pa., assignor to Minneapolis-Honeywell Regulator Company, Minneapolis, Minn., a corporation of Delaware Application March 18, 1953, Serial No. 343,102

2 Claims. (Cl. 324—142)

The general object of this invention is to provide a new and improved electrical measuring apparatus which is capable of combining a plurality of electrical input signals to produce an output signal proportional to a combination of the input signals.

This invention is particularly adapted to the field of electric measurement, where it is often desirable to produce a direct current voltage which is proportional to an alternating current function. An instrument capable of producing such a voltage can be used in conjunction with an indicating or recording millivoltmeter or potentiometer, and can be incorporated into a telemetering or a control system.

Accordingly, a specific object of this invention is to provide an alternating current power measuring apparatus which is capable of producing a direct current voltage porportional to alternating current power being measured.

Heretofore, it has been the general practice to use either a thermal converter, that is, a thermal-electric converting apparatus, or a photoelectric dynamometer type instrument to generate a direct current voltage proportional to the alternating current power being measured. Thermal converters use the current and the voltage supplied to the circuit where power is being measured to produce a temperature difference proportional to that power. The temperature difference thus produced is measured by suitable means, such as thermocouples. Because they operate by thermal means, thermal converters generally require an hour or more to "warm up," that is, to reach the operating condition at which they will function with their rated accuracy, and, even after reaching such condition, are subject to errors if exposed to sudden temperature changes. The photoelectric dynamometer type instrument employs a photocell, a light source, and a mirror mounted on the moving coil of a dynamometer. These instruments are, therefore, delicate, sensitive to vibration, and subject to the errors due to variations in the light source.

It is, therefore, a further object of this invention to provide a measuring apparatus which overcomes these prior art deficiencies. This is accomplished by utilizing a principle of operation which is not dependent on either thermal or photoelectric means. The principle employed is that, when an alternating current signal is rectified in a synchronous rectifier, the output of that rectifier is a unidirectional signal proportional to the alternating current signal rectified multiplied by the cosine of the phase angle between that signal and the rectifier driving signal.

Still another object of this invention is to provide an electrical measuring apparatus which employs two rectifiers, one of which is operated in accordance with a function directly related to the other, where the outputs of said rectifiers are electrically combined to produce a signal proportional to a combination of these outputs.

The various features of novelty which characterize this invention are pointed out with particularity in the claims annexed to and forming a part of this specification. For a better understanding of this invention, its advantages, and specific objects attained with its use, reference should be had to the accompanying drawings and descriptive matter in which are illustrated and described preferred embodiments of this invention.

FIGURE 1

Figure 1:
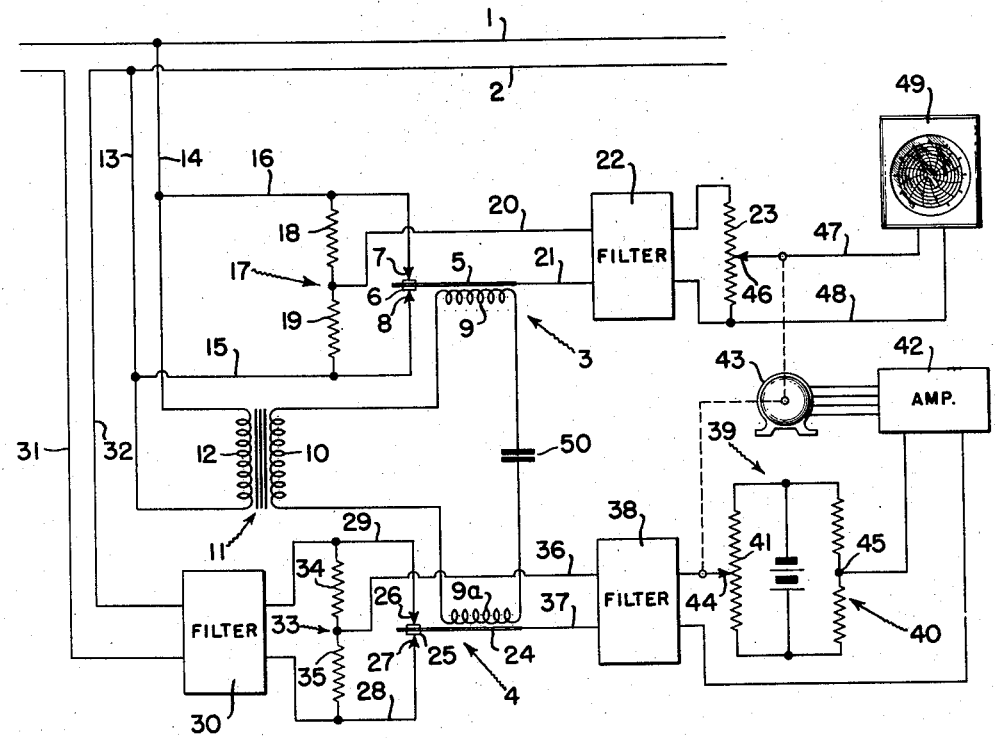
Figure 1 is a diagram illustrating one embodiment of this invention applied to an electric power measuring device.

Referring to Figure 1, there is schematically illustrated an embodiment of this invention adapted to produce and measure a D.C. voltage proportional to the electric power being delivered by the alternating current conductors 1 and 2. Two similar vibrating reed synchronous rectifiers 3 and 4 are employed to rectify electric signals which are proportional to the voltage across and the current in conductors 1 and 2. These synchronous rectifiers are of the type that have equal contacting percentages and a negligible transit time between contacts.

The synchronous rectifier 3 includes a reed 5, carrying a pair of contacts 6, which is caused to vibrate between the contacts 7 and 8 under the influence of a varying magnetic field produced by the coil 9. The current in coil 9 is derived from the secondary winding 10 of transformer 11 having a primary winding 12 connected across conductors 1 and 2 by leads 13 and 14. Due to mechanical inertia, the motion of the reed 5 lags the current in the coil 9 by a fixed amount. To correct for this lag, the condenser 50 is connected in series with the coil 9 across the secondary 10 of the transformer 11. The condenser 50 causes the current in the coil 9 to lead the voltage across the conductors 1 and 2 by an amount equal to the angular lag of the motion of the reed 5, and thus the reed 5 will vibrate in phase with the voltage across the conductors 1 and 2. The contacts 7 and 8 are connected across the conductors 1 and 2, through leads 13 and 14, by leads 15 and 16. The input to synchronous rectifier 3 also includes a voltage divider 17 comprising similar resistors 18 and 19. The output of synchronous rectifier 3 appears across leads 20 and 21 which are connected through a filter 22 to a multiplying slide wire 23.

The synchronous rectifier 4 is mechanically and electrically similar to the synchronous rectifier 3 and includes a reed 24, carrying a pair of contacts 25, which is caused to vibrate between the contacts 26 and 27 under the influence of a varying magnetic field produced by coil 9a. The coil 9a is connected in series with the coil 9 and the condenser 50 across the secondary 10 of the transformer 11, and thus the reed 24 will vibrate in phase with the voltage across the conductors 1 and 2. Contacts 26 and 27 are connected by leads 28 and 29 through filter 30, which is connected to conductor 2 by leads 31 and 32. The filter 30 can be any suitable filter designed to eliminate the third and higher harmonic of the current. It is included because the third harmonic component will complete one and one half cycles for every half cycle completed by the fundamental and thus it will reduce the average D.C. value of the synchronous rectifier output while supplying no power to the load when the voltage has no similar component, which is the usual condition. The input of synchronous rectifier 4 also includes voltage divider 33, comprising similar resistors 34 and 35. The output of synchronous rectifier 4 appears across leads 36 and 37 which are connected through a filter 38 and a self-balancing potentiometric apparatus 39.

The self-balancing potentiometric apparatus 39 includes a potentiometer circuit 40, having a slide wire 41, and an amplifier 42 which drives a rebalancing motor 43. The rebalancing motor 43 positions not only a slider 44 on the slide wire 41 but also a slider 46 on the multiplying slide wire 23. By interlocking the output of synchronous rectifier 3 in this manner, the output from the multiplying slide wire 23, which appears across the leads 47 and 48, is proportional to the product of both rectifier outputs. The leads 47 and 48 are connected to a suitable indicating and recording instrument 49 which may be of the self-balancing potentiometer type. Such an apparatus is disclosed and claimed in the Walter P. Wills Patent 2,423,540 of July 8, 1947.

*Operation of Figure 1*

The average power delivered to a load by a pair of alternating current conductors is $$P = VI \cos(\theta_v - \theta_i)$$

where V and I are the R.M.S. values of the voltage across and the current in the conductors and $(\theta_v - \theta_i)$ is the angular phase difference between the current and voltage. To produce a D.C. voltage proportional to the average power being delivered by the conductors 1 and 2, the embodiment of this invention illustrated in Figure 1 employs the synchronous rectifiers 3 and 4. The input of the synchronous rectifier 3 is connected across the conductors 1 and 2 and thus it will rectify a signal proportional to the voltage across those conductors. The input of the synchronous rectifier 4 is connected in the conductor 2 and thus, it will rectify a signal proportional to the current in the conductors 1 and 2. Suitable voltage and current transformers can be introduced between the inputs of the synchronous rectifiers and the power carrying conductors if the voltage across or the current in the conductors is of unsuitable value.

The synchronous rectifiers 3 and 4 function in a similar manner; therefore, the rectifying action of both can be understood by considering the operation of the synchronous rectifier 3. Assume that during the first half cycle of the alternating voltage applied to the conductors 1 and 2, the line 2 is positive with respect to line 1, and that during the second half cycle the opposite condition is true. Assume also though that during the first half cycle the vibrating reed 5 is moved upwards to cause the contact 6 to engage the contact 7 and to disengage the contact 8 and that during the second half cycle the vibrating reed 5 is moved downward to cause the contact 6 to engage the contact 8 and to disengage the contact 7. During the first half cycle of the alternating voltage across the conductors 1 and 2 a signal proportional to that voltage will flow through leads 13 and 15, upward through resistor 19, through lead 20 to the filter 22 and the multiplying slide wire 23, back through lead 21 and reed 5, through contacts 6 and 7, and through leads 16 and 14 to the conductor 1. During the second half cycle of the alternating voltage across the conductors 1 and 2, a signal proportional to that voltage will flow through leads 14 and 16, downwards through resistor 18, through lead 20 to filter 22 and multiplying slide wire 23, back through lead 21 and reed 5, through contacts 6 and 8, and through leads 15 and 13 to the conductor 2.

Figure 2:
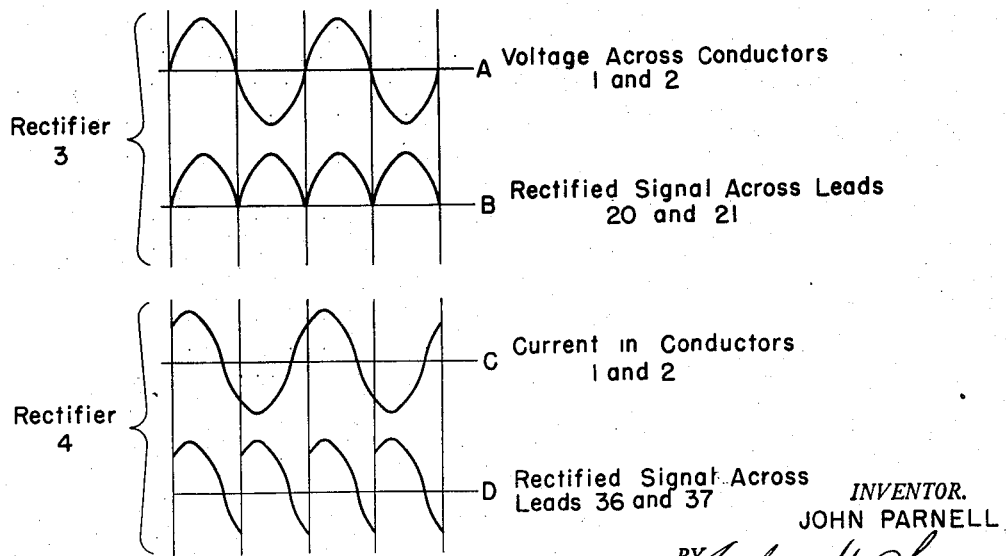
Figure 2 shows curves which illustrate typical output signals of the rectifiers used in Figure 1.

Figure 2 shows curves which illustrate typical input signals to and output signals from the synchronous rectifiers 3 and 4. Figure 2A shows the voltage across the conductors 1 and 2. Figure 2B shows the rectified voltage across the leads 20 and 21. This voltage has an average D.C. value proportional to the voltage across the conductors 1 and 2. Figure 2C shows the current in the conductors 1 and 2. Figure 2D shows the rectified voltage across the leads 36 and 37. Since the reed 24 vibrates in phase with the voltage across the conductors 1 and 2, this voltage has an average D.C. value proportional to the current in the conductors 1 and 2 times the cosine of the phase angle between the voltage across and the current in those conductors.

By combining the output of the synchronous rectifier 3 with the output of the synchronous rectifier 4 to produce a signal proportional to their product, a signal proportional to the power being delivered by the conductors 1 and 2 is obtained. To accomplish this the multiplying slide wire 23 and self-balancing potentiometric apparatus 39 are employed. The ripple on the output of the synchronous rectifier 3 is eliminated by the smoothing filter 22 before that output is applied to the multiplying slide wire 23. Thus, there appears on slide wire 23 a direct current voltage proportional to the line voltage across conductors 1 and 2.

The output of the synchronous rectifier 4, also a direct current, is filtered by the smoothing filter 38 before it is applied to the self-balancing potentiometric apparatus 39. The self-balancing potentiometric apparatus 39 functions to position the slider 44 on the slide wire 41 until a balance condition exists on the potentiometer circuit 40. In the balanced condition of the potentiometer circuit 40, the voltage between the slider 44 and the point 45 is equal and opposite to the output voltage of the synchronous rectifier 4. When the circuit is thus balanced, a voltage change in the output of the synchronous rectifier 4 in either direction will unbalance the potentiometer circuit. When this occurs, the amplifier 42 will detect and amplify the unbalance voltage and drive the rebalancing motor 43 in a direction and to the extent required to adjust the slider 44 into a position in which the potentiometer circuit is rebalanced. Thus, the position of the slider 44 on the slide wire 41 indicates the magnitude of the product of the current in the conductors 1 and 2 times the cosine of the phase angle between the voltage across and the current in those conductors.

In positioning the slider 44 on the slide wire 41, the motor 43 also positions the slider 46 on the multiplying slide wire 23 and thus the position of the slider 46 is dependent upon the magnitude of the output signal from the rectifier 4. In this manner, the output of the multiplying slide wire 23 which appears across the leads 47 and 48 is made proportional to the product of the outputs of the synchronous rectifiers 3 and 4. Since the output of the synchronous rectifier 3 is proportional to the magnitude of the voltage across the conductors 1 and 2 and the output of the synchronous rectifier 4 is proportional to the magnitude of the current in the conductors 1 and 2 times the cosine of the phase angle between the voltage across and the current in conductors 1 and 2, the output of the multiplying slide wire 23 is proportional to the power being delivered by the conductors 1 and 2. The leads 47 and 48 are connected to the indicating and recording instrument 49 which indicates and records the power being delivered by the conductors 1 and 2.

FIGURE 3

Figure 3:
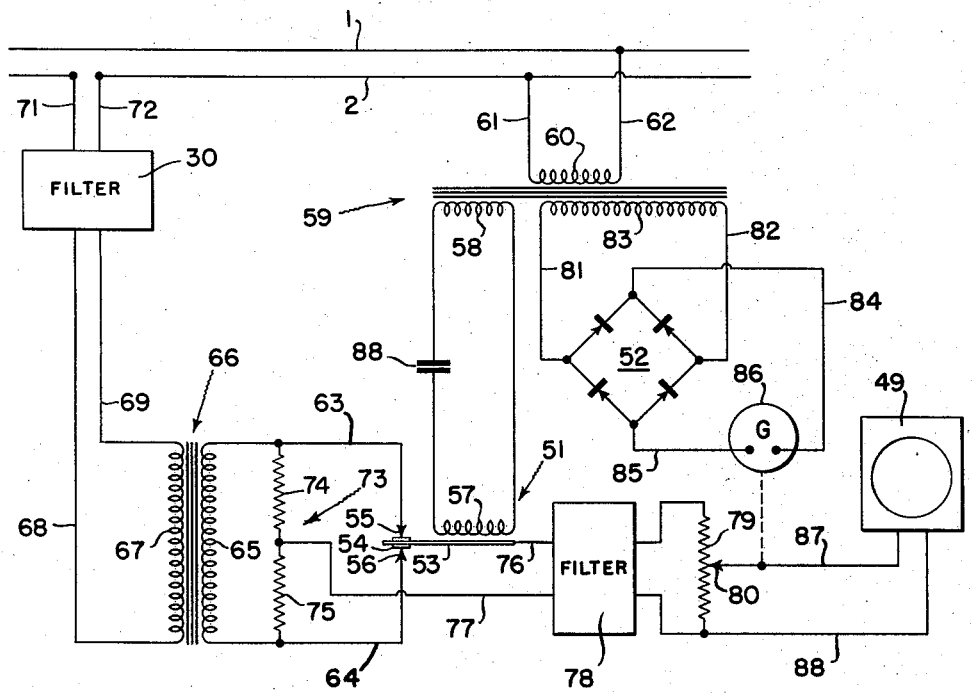
Figure 3 is a diagram of another embodiment of this invention applied to measure electric power.

In Figure 3 there is illustrated another embodiment of this invention adapted to produce and measure a direct current voltage proportional to the power being delivered to a load by the conductors 1 and 2. This embodiment employs a vibrating reed synchronous rectifier 51 to rectify a signal proportional to the current in the conductors 1 and 2 and a non-mechanical rectifier 52 to rectify a signal proportional to the voltage across the conductors 1 and 2. While a bridge rectifier is shown, any conventional rectifier may be used, with a full wave rectifier preferred.

The synchronous rectifier 51 includes a reed 53, carrying a pair of contacts 54, which is caused to vibrate between the contacts 55 and 56 under the influence of a varied magnetic field produced by a coil 57. The current in the coil 57 is derived from the secondary winding 58 of the transformer 59 having a primary winding 60 connected across the conductors 1 and 2 by the leads 61 and 62. The condenser 88 is connected in series with the coil 57 to bring the motion of the vibrating reed 53 in phase with the voltage across the conductors 1 and 2. The contacts 55 and 56 are connected by the leads 63 and 64 to the secondary winding 65 of the current transformer 66. The primary winding 67 of the current transformer 66 is connected by the leads 68 and 69 to the filter 30 which is in turn connected to the conductor 2 by the leads 71 and 72. The input to the synchronous rectifier 51 also includes the voltage divider 73 comprising similar resistors 74 and 75. The output of the synchronous rectifier 51 appears across the leads 76 and 77 which are connected through the filter 78 to the multiplying slide wire 79. The multiplying slide wire 79 is a variable resistance element having a movable slider 80 which is adapted to be positioned by an ultra low torque. There are commercially available variable resistance elements requiring as little as 0.0015 inch-ounces of torque for their operation.

The input of the bridge rectifier 52 is connected by the leads 81 and 82 to the secondary winding 83 of the transformer 59 and thus the bridge rectifier 52 rectifies a signal which is proportional to the voltage across the conductors 1 and 2. The output of the bridge rectifier 52 is connected by the leads 84 and 85 to the moving coil of the galvanometer 86. The coil shaft of the galvanometer 86 is mechanically coupled to the movable contact 80 of the multiplying slide wire 79 so that the displacement of the coil will position the slider 80. The output of the multiplying slide wire 79 is applied to the indicating and recording potentiometer 49 by the leads 87 and 88.

*Operation of Figure 3*

To produce a D.C. voltage proportional to the average power being delivered by the conductors 1 and 2, the embodiment of this invention illustrated in Figure 3 employs bridge rectifier 52 and the synchronous rectifier 51. The input of the bridge rectifier is connected across the conductors 1 and 2 through the potential transformer 59 and thus it will rectify a signal proportional to the voltage across those conductors. The input to the synchronous rectifier 51 is connected in the conductor 2 through the current transformer 66 and the filter 30, and thus it will rectify a signal proportional to the fundamental current in the conductors 1 and 2.

The operation of the synchronous rectifier 51 is similar to the operation of the synchronous rectifier 4 in the device illustrated in Figure 1. As in Figure 1, the filter 30 is used to remove any third harmonic or higher component from the signal which is applied to the synchronous rectifier. The current transformer 66 is also inserted between the input of the synchronous rectifier 51 and the conductor 2. The transformers 59 and 66 can be eliminated from the circuit if the magnitude of the voltage across and the current in the conductors 1 and 2 provides a suitable signal. As mentioned before, reed 53 of the synchronous rectifier 51 vibrates in phase with the voltage across the conductors 1 and 2. Thus, the output of the synchronous rectifier 51, whch appears across the conductors 76 and 77, has an average D.C. value proportional to the current in the conductors 1 and 2 times the cosine of the phase angle between the voltage across and the current in those conductors. The ripple on the output of the synchronous rectifier 51 is eliminated by the smoothing filter 78 before that output is applied to the multiplying slide wire 79.

As mentioned before the input of the bridge rectifier 52 is connected through the transformer 59 across the conductors 1 and 2, whereby the rectifier 52 rectifies a signal proportional to the voltage across the conductors 1 and 2. The output of the bridge rectifier 52 is a voltage having an average D.C. value prorportional to the voltage across the conductors 1 and 2. This voltage is applied to the moving coil of the galvanometer 86. Because of the filtering action inherent in a galvanometer, it is not necessary to filter the output of the bridge rectifier 52 to eliminate the ripple. To combine the outputs of both of the rectifiers to obtain a signal proportional to their product, the shaft of the moving coil of the galvanometer 86 is mechanically coupled to the moving contact 80 of the multiplying slide wire 79. Thus, the position of the sliding contact 80 on the multiplying slide wire 79 is dependent on the angular deflection of the moving coil of the galvanometer 86. The instrument is calibrated by the galvanometer coil restoring springs, not shown. Since the output of the bridge rectifier 52 is proportional to the magnitude of the voltage across the conductors 1 and 2, and the output of the synchronous rectifier 51 is proportional to the magnitude of the current in the conductors 1 and 2 times the cosine of the phase angle between the voltage across and the current in those conductors, the output of the multiplying slide wire 79 is proportional to the power being delivered by the conductors 1 and 2. The leads 87 and 88 are connected to an indicating and recording instrument 49 which indicates and records the power being delivered by the conductors 1 and 2.

While, in accordance with the provisions of the statues, there is illustrated and described the best form of the invention now known, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. An electrical power measuring apparatus, comprising in combination, two vibrating reed synchronous rectifiers synchronously driven in phase with the voltage across a pair of alternating current conductors delivering the power to be measured, each of said rectifiers having an input and an output, circuit means connecting the input of the first of said rectifiers across the pair of alternating current conductors delivering the power to be measured, said first rectifier being operative when so connected to produce in its output a unidirectional voltage proportional to the voltage across said conductors, circuit means connecting the input of the second of said synchronous rectifiers in series in one of said pair of alternating current conductors delivering the power to be measured, said second rectifier being operative when so connected to produce in its output a unidirectional voltage proportional to the current in said conductors multiplied by the cosine of the phase angle between the voltage across and the current in said conductors, circuit means connecting the output of the first of said rectifiers to the input of a multiplying slidewire having an input and an output, circuit means connecting the output of the second of said rectifiers to the input of a self-balancing potentiometric apparatus, said potentiometric apparatus having a sliding contact on said multiplying slidewire positioned in accordance with the magnitude of the output of the second of said rectifiers, and signal utilization means connected to the output of said multiplying slidewire to indicate the power being delivered by said conductors.

2. An electrical power measuring apparatus, comprising in combination, two vibrating reed synchronous rectifiers synchronously driven in phase with and by a voltage derived from across a pair of alternating current conductors delivering the power to be measured, each of said rectifiers having an input and output, circuit means connecting the input of the first of said synchronous rectifiers across the pair of alternating current conductors delivering the power to be measured, said first rectifier being operative when so connected to produce in its output a unidirectional voltage proportional to the voltage across said conductors, circuit means including a filter, operative to eliminate harmonics of the fundamental from the filtered signal, connecting the input of the second of said synchronous rectifiers in series with one of said alternating current conductors delivering the power to be measured, said second rectifier being operative when so connected to produce in its output a unidirectional voltage proportional to the current in said conductors multiplied by a cosine of the phase angle between the voltage across and the current in said conductors, a smoothing filter connecting the output of the first of said rectifiers to the input of a multiplying slidewire having an input and an output, a smoothing filter connecting the output of the second of said rectifiers to the input of a self-balancing potentiometric apparatus, said potentiometric apparatus having a sliding contact on said multiplying slide wire positioned in accordance with the magnitude of the output of the second of said rectifiers, and signal utilization means connected to the output of the multiplying slide wire to indicate the output from said multiplying slidewire which is proportional to the power being delivered by said conductors.

References Cited in the file of this patent

UNITED STATES PATENTS

| | | |
|---|---|---|
| 1,657,262 | Karapetoff | Jan. 24, 1928 |
| 1,915,581 | Schneider | June 27, 1933 |
| 2,133,670 | Schuchmann | Oct. 18, 1938 |
| 2,282,396 | Cravath | May 12, 1942 |
| 2,551,291 | Rich | May 1, 1951 |
| 2,749,036 | Langworthy | June 5, 1956 |

FOREIGN PATENTS

| | | |
|---|---|---|
| 160,053 | Switzerland | Apr. 17, 1933 |